UNITED STATES PATENT OFFICE.

WILLIAM J. SKIFF, OF CHICAGO, ILLINOIS, ASSIGNOR TO WILLIAM SLOSSON, OF SAME PLACE.

PROCESS OF MAKING A COMPOUND RESEMBLING BUTTER.

SPECIFICATION forming part of Letters Patent No. 373,618, dated November 22, 1887.

Application filed April 30, 1887. Serial No. 236,671. (No specimens.)

*To all whom it may concern:*

Be it known that I, WILLIAM J. SKIFF, a citizen of the United States, residing at Chicago, in the county of Cook and State of Illinois, have invented a new and useful Process of Making a Compound Resembling Butter, of which the following is a specification; and I do hereby declare that the following is a full, clear, and exact description, such as will enable others skilled in the art to which it pertains to make and use the same.

My invention relates to the manufacture of a butter compound by mechanical and chemical processes from the milk of animals, and has for its object to provide means and methods whereby all or substantially all of the solids contained in such milk shall be reduced to a butter compound. This object I accomplish by means of the processes hereinafter described, and although these processes might be carried out with more or less variation to a successful result, and although other mechanism than that hereinafter described might be successfully employed for the purpose of carrying out such processes, still I deem it proper to state that the butter compound, according to my improved method, is or may be manufactured by the use of the following appliances: first, a tank or kettle, and I prefer the same to be a steam or hot-water jacketed kettle or tank; second, a churn—a revolving churn I consider preferable; third, a mixer or stirrer, the same being preferably a steam or hot-water jacketed vessel with a power-rotated stirring device therein; fourth, a dipping brine-tank; fifth, a working-table.

The following is the process: Any quantity of milk or cream in any of its ordinary conditions and at any temperature is turned into a tank—as, for instance, a steam-jacketed cream-tank. This milk or cream may be of different ages. Here it is permitted to remain, according to its condition and temperature and the age of the milk, (all of which has to be determined by experience and varied with each operation to a certain extent,) a certain period, from twelve to forty hours, as the case may require. During this time it is also raised to a high temperature—as, for instance, 95°. It remains in this tank until it becomes partly curdled. It is then cooled in the tank by using the jacket as a cold-water jacket until it is reduced to a temperature varying from 54° to 65°, the lower the better. The entire quantity of milk or cream so treated is then turned into the churn, and here churned for from ten to sixty minutes, until the mass presents to view a quantity of butter globules, as in the case of the ordinary manufacture of butter. A quantity of pure butter is now reduced to an oil by heat. This is accomplished by placing it in the jacketed stirring-tank above alluded to and thoroughly agitating it by the mechanism therein contained, and at the same time raising it to a temperature from 70° to 95°. This operation is continued until the butter has become an oil and thoroughly stirred and mixed and flowing freely. This oil butter is now poured into the churn in the proportion of two pounds or more of oil butter to one gallon of the contents of the churn. The churn is then operated for from eight to thirty-five minutes. It will then be found that the entire contents of the churn has the appearance of a buttery substance of the consistency of molasses, uniform throughout in color and character. It should be churned until it assumes such character and shape.

In some cases I have found it preferable to put the contents of the churn into the stirrer, preserving the same proportions of the oil butter in the stirrer to the quantity of substance from the churn turned into the stirrer; but the process is practically the same in each case, as the stirrer only serves in the latter instance for a churn.

The object of supplying the oil butter to the churn product is to cause all of the solids in the churn contents to be gathered up and collected, as it were, into a mass by the agency of the oil butter, and this is accomplished most thoroughly and effectively by means of the heated oil butter when applied as above set forth. This product, having the consistency of molasses, is now turned into a large brine-tank, the temperature of the brine being somewhat low—from 45° to 75°—and here it is stirred in the brine, broken up as it were, by any convenient and desired process. It is permitted to remain in the bath as long as desired, or until the solids collect together in masses of greater or less solidity. These masses are then removed and placed upon the working board or table, where they are worked and the desired quantity of water removed from them. Thereupon it is found that a very perfect and satisfactory product remains, the same consisting of substantially all of the solids of the milk, the water alone being removed therefrom. This product can be worked until it assumes any degree of hardness desired, and is then packed, shipped, and treated in the usual manner. The whole object of this system is to utilize substantially all the solids of the milk.

The successive steps in my improved process above described result, first, in reducing the milk to a curd by raising its temperature, thus separating the solids (caseine, sugar, and salt) from the water; second, in cooling and churning this product, whereby the said solids are collected and butter globules are formed or appear; third, in combining with this product a certain proportion of butter-oil; fourth, churning this product until the solids are reduced to a liquid state and the same approximates the consistency of molasses; fifth, immersing this product in a cold brine bath and stirring the same until the compound is gathered in lumps, and, lastly, in working and salting these lumps in the usual manner until they are suitably hardened, when the butter compound is ready to be formed in prints or packages and marketed.

I am aware that the steps in the above-described process are, most of them, old *per se;* but I am not aware of the employment heretofore of butter-oil in connection with curdled milk for producing the result described; nor am I aware that the several steps in the process described have been employed in the order specified, and which has been found most effective in producing the desired result.

Having thus described my invention, what I claim, and desire to secure by Letters Patent of the United States, is as follows:

The process of collecting the solids of milk into a butter compound, which consists in taking a quantity of animal milk in any condition, raising the same to a comparatively high temperature, about 95°, permitting it to stand until curdled, then churning until seeds of butter appear, then mixing with it a suitable quantity of butter-oil, then churning until the compound assumes the consistency of molasses, then immersing the compound in a cold brine bath and stirring the same until the butter is gathered in lumps, and then working and salting such lumps until suitably hardened into packages suitable for market.

WILLIAM J. SKIFF.

Witnesses:
 FRANCIS W. PARKER,
 WM. SLOSSON.